(12) United States Patent
Chang (10) Patent No.: US 7,657,433 B1
(45) Date of Patent: Feb. 2, 2010

(54) SPEECH RECOGNITION ACCURACY WITH MULTI-CONFIDENCE THRESHOLDS

(75) Inventor: Shuangyu Chang, Fremont, CA (US)

(73) Assignee: TellMe Networks, Inc., Mountain View, CA (US)

(*) Notice: Subject to any disclaimer, the term of this patent is extended or adjusted under 35 U.S.C. 154(b) by 528 days.

(21) Appl. No.: 11/530,212

(22) Filed: Sep. 8, 2006

(51) Int. Cl.
*G10L 15/04* (2006.01)
(52) U.S. Cl. .................. 704/252; 704/236; 704/245
(58) Field of Classification Search .................. 704/240, 704/231, 246, 236, 248, 238, 239, 270, 252, 704/255, 245
See application file for complete search history.

(56) References Cited

U.S. PATENT DOCUMENTS

| | | | | |
|---|---|---|---|---|
| 6,473,735 | B1 * | 10/2002 | Wu et al. | 704/240 |
| 6,850,886 | B2 * | 2/2005 | Abrego et al. | 704/240 |
| 7,103,542 | B2 * | 9/2006 | Doyle | 704/231 |
| H2187 | H * | 4/2007 | Yuchimiuk | 704/246 |

OTHER PUBLICATIONS

"National Institute of Standard arid Technology (NIST) SCLItc—speech recognition scoring program," http://www.nlst.gov/speech/tools/index.html [Aug. 9, 2007].
Chang, Shuangyu, "Improving Speech Recognition Accuracy with Multi Confidence Thresholding," Interspeech 2006, ICSLP Ninth International Conference on Spoken Language Processing, Pittsburgh, PA, USA, Sep. 17-21, 2006, 5 pages.
Chen, Z. and Ding, X., "Rejection Algorithm for Mis-segmented Characters in Multilingual Document Recognition," In Proceedings of 7th Intl. Conf. on Doc. Analysis and Recognition, vol. 2, 2003, 4 pages.
Gunawardana, A., I-Ion, H. And Jiang, L. "Word-Based Acoustic Confidence Measures for Large-Vocabulary Speech Recognition," In Proceeding of ICSLP98, 1998, 4 pages.
Gupta, S. and Soong, F., "Improved Utterance Rejection Using Length Dependent Thresholds," 117 Proceedings of ICSLP98, Sydney, 1998.
Wessel, F., Schluter, Macherey, K. and Ney, H., "Confidence Measures for Large Vocabulary Continuous Speech Recognition," In IEEE Trans. Speech and Audio Processing, vol. 9, No. 3, Mar. 2001, pp. 288-298.
Williams, D. A., "Knowing What You Don't Know: Roles for Confidence Measures in Automatic Speech Recognition," Ph.D. Dissertation, University of Sheffield, May 1999, 123 pages.

* cited by examiner

*Primary Examiner*—Huyen X. Vo
(74) *Attorney, Agent, or Firm*—Perkins Coie LLP (57) ABSTRACT

A speech recognition system uses multiple confidence thresholds to improve the quality of speech recognition results. The choice of which confidence threshold to use for a particular utterance may be based on one or more features relating to the utterance. In one particular implementation, the speech recognition system includes a speech recognition engine that provides speech recognition results and a confidence score for an input utterance. The system also includes a threshold selection component that determines, based on the received input utterance, a threshold value corresponding to the input utterance. The system further includes a threshold component that accepts the recognition results based on a comparison of the confidence score to the threshold value.

26 Claims, 9 Drawing Sheets

SPEECH RECOGNITION ACCURACY WITH MULTI-CONFIDENCE THRESHOLDS

BACKGROUND

A. Field of the Invention

Techniques described herein relate generally to interactive voice response systems, and, more specifically, to improving speech recognition results in an interactive voice response system.

B. Description of the Related Art

Interactive voice response, or IVR, refers to a computerized system that allows a user, typically a telephone caller, to select an option from a voice menu or otherwise interface with a computer system. Generally, the system plays prerecorded voice prompts to which the user responds by either pressing a number on a telephone keypad or speaking to the system.

In IVR systems that allow a user to interact verbally with the system, a speech recognition engine is used to attempt to automatically recognize what the person is trying to say. Speech recognition engines typically return two major components in response to an input speech utterance: (1) the textual transcription and/or semantic interpretation (also referred to as a "recognition result") of the utterance; and (2) a confidence measure of the recognition result. The IVR system will typically compare the confidence measure with a predetermined threshold and only accept the recognition result if the confidence measure is above the threshold. An accurate confidence estimation and a properly set confidence rejection threshold can significantly improve the tradeoff between minimizing false acceptance (FA) of erroneous recognition results and maximizing correct acceptance (CA) of good recognition results.

SUMMARY

One aspect is directed to a speech recognition system that may include a speech recognition engine, a threshold selection component, and a threshold component. The speech recognition engine receives an input utterance, provides recognition results corresponding to the input utterance, and provides a confidence score corresponding to a confidence level in the recognition results. The threshold selection component determines, based on the received input utterance, a threshold value corresponding to the input utterance. The threshold component accepts the recognition results based on a comparison of the confidence score to the threshold value.

Another aspect is directed to a method that may include receiving an utterance from a user, generating speech recognition results corresponding to the utterance and a confidence score corresponding to a confidence level in the accuracy of the speech recognition results, and classifying the utterance into one of a plurality of partitions based on a predetermined feature relating to the utterance or to the user. The method may further include determining a threshold value from a number of possible threshold values based on the partition into which the utterance is classified, and determining whether to accept or reject the recognition results based on the threshold and the confidence score.

Yet another aspect is directed to a device that may include logic to receive input information from a user, logic to generate recognition results corresponding to the input information and a confidence score corresponding to a confidence level in the accuracy of the recognition results, and logic to classify the input information into one of a number of partitions based on a predetermined feature relating to the input information or to the user. The device may further include logic to determine a threshold value from possible threshold values based on the partition into which the input information is classified, and logic to determine whether to accept or reject the recognition results based on the threshold and the confidence score.

Yet another aspect is directed to a method of training a pattern recognition system. The method may include obtaining training data, defining partitions for the training data based on a feature associated with the training data, and automatically determining a confidence threshold for each partition. In run-time operation of the pattern recognition system, input information may be converted into pattern recognition results and the input information may be classified into one of the partitions based on the feature and accepted or rejected as valid pattern recognition results based on a comparison of the confidence threshold corresponding to the one of the partitions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The same reference numbers in different drawings may identify the same or similar elements. The detailed description does not limit the invention.

Overview

A speech recognition system is described herein in which multiple confidence thresholds are used to improve the quality of speech recognition results. The choice of which confidence threshold to use for a particular utterance may be based on one or more features relating to the utterance.

System Description

Figure 1:
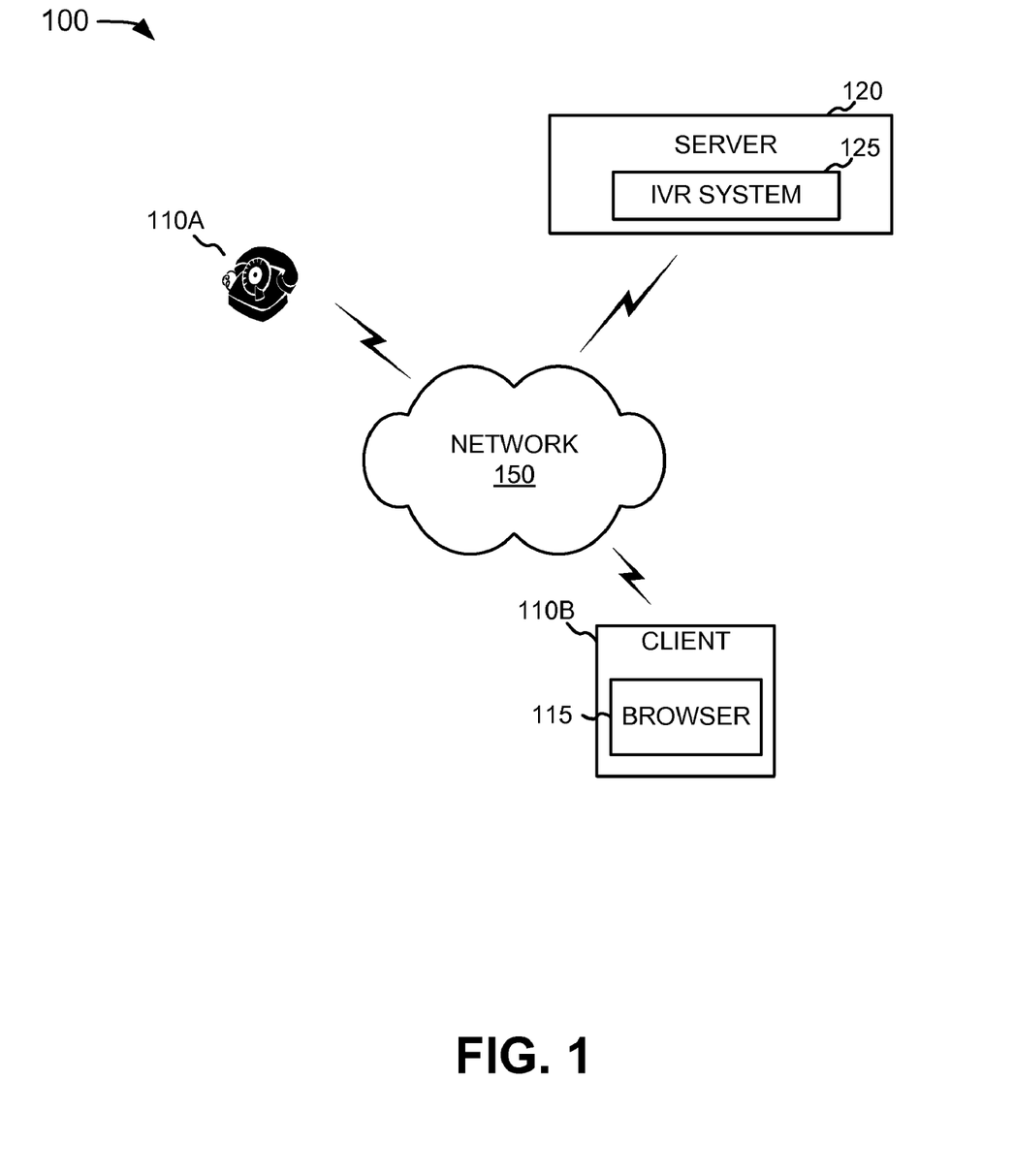
FIG. 1 is a diagram of an exemplary system in which concepts consistent with principles of the invention may be implemented.

FIG. 1 is a diagram of an exemplary system 100 in which concepts consistent with principles of the invention may be implemented. System 100 may include multiple clients 110A and 110B (collectively, clients 110) that can connect to a server 120, via a network 150. Network 150 may include a local area network (LAN), a wide area network (WAN), a telephone network, such as the Public Switched Telephone Network (PSTN) or a cellular network, an intranet, the Internet, or a combination of networks. Clients 110 and server 120 are illustrated as connected to network 150 for simplicity. In practice, there may be more clients and/or servers. Also, in some instances, a client may perform one or more functions of a server and a server may perform one or more functions of a client.

Clients 110 may include a relatively non-complex telephone, such as client 110A, or a computing device such as client 110B. Clients such as client 110B may include, for example, a personal computer, a lap top computer, a personal digital assistant (PDA), or another type of computation or communication device. Clients 110A and 110B may connect to server 120 over different types of network connections. For example, client 110A may connect to server 120 via a PSTN or a cellular network, and client 110B may connect to server 110 using a packet switched network such as the Internet.

Users of clients 110 may access or receive information from server 120. For example, server 120 may act as or include an IVR system 125 that interacts with and provides responses to users of clients 110. For example, a user of client 110A may call server 120 to obtain information, such as directory information, account information, weather information, sports scores, etc. The user of client 110A may interact with server 120 vocally, such as by speaking commands in response to audio prompts from server 120. Server 120 may use automated speech recognition techniques to recognize the spoken commands and to act accordingly, such as by providing client 110A with additional audio information.

As another example, server 120 may additionally or alternatively act as a voice server that delivers voice information to a voice browser program 115 provided by client 110B via the VoiceXML (VXML) standard. Voice browser program 115 may present an interactive voice interface to the user. Similar to the manner in which a visual web browser works with HTML pages, voice browser program 115 may operate on pages that specify voice dialogues and may present information aurally, using pre-recorded audio file playback or using text-to-speech software to render textual information as audio, to the user. Client 110B may additionally include a microphone that allows the user of client 110B to transmit voice commands back to server 120.

IVR system 125 may facilitate interactive voice sessions with clients 110. Aspects of IVR system 125 will be described in more detail below.

Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context or the role of the computing device within the application.

Exemplary Computing Device Architecture

Figure 2:
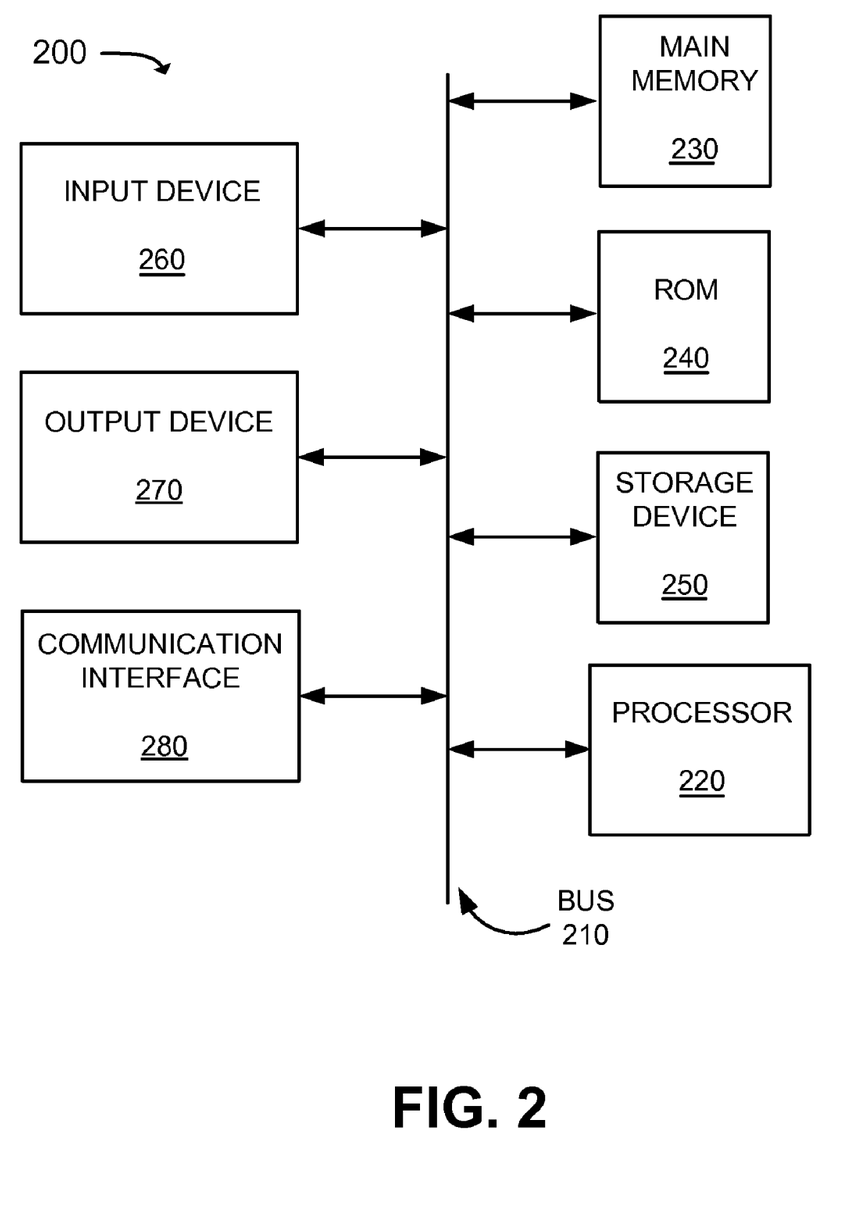
FIG. 2 is an exemplary diagram of one of the computing devices shown in FIG. 1.

FIG. 2 is an exemplary diagram of a computing device 200, such as client 110B or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, a microphone and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 150.

Applications executed by computing device 200, such as browser 115 or IVR system 125, may be implemented in software and stored in a computer-readable medium, such as memory 230. A computer-readable medium may be defined as one or more physical or logical memory devices.

The software instructions defining applications executed by computer device 200 may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the present invention. Thus, implementations consistent with principles of the invention are not limited to any specific combination of hardware circuitry and software.

IVR System 125

When interacting with users, IVR system 125 may receive voice commands, called utterances herein, from the users. It is desirable that the utterances be converted to a textual transcription and/or a semantic interpretation.

Figure 3:
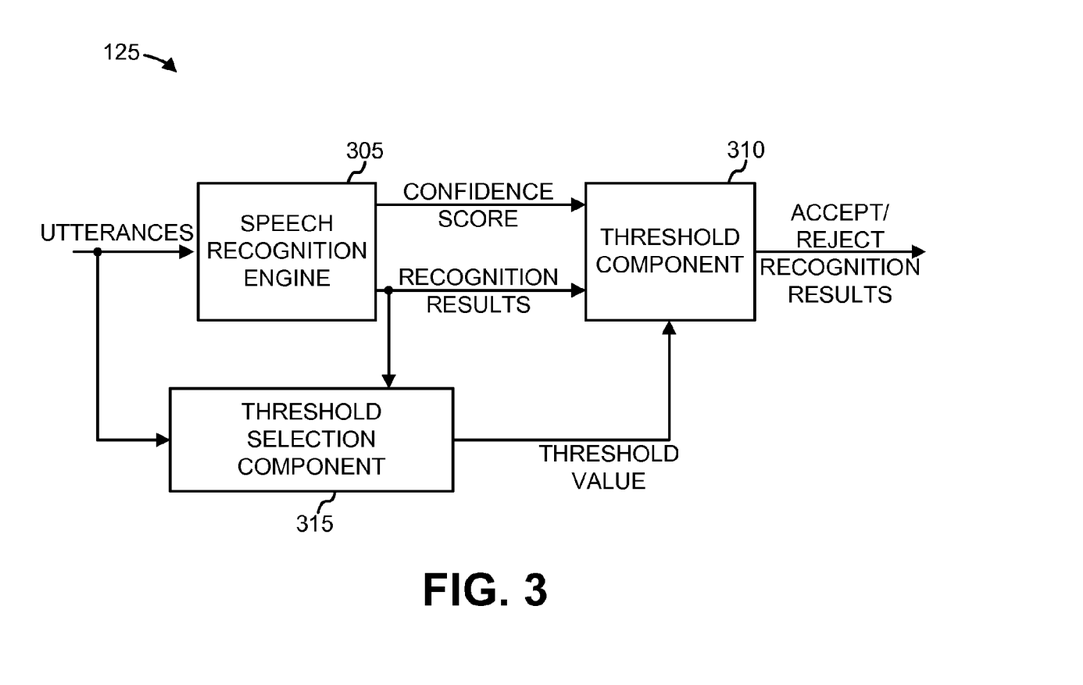
FIG. 3 is a diagram conceptually illustrating exemplary portions of an IVR system.

FIG. 3 is a diagram conceptually illustrating exemplary portions of IVR system 125 that relate to the conversion of utterances to a textual transcription or a semantic interpretation (i.e., recognition results). IVR system 125 may include a speech recognition engine 305, a threshold component 310, and a threshold selection component 315.

Utterances input to IVR system 125 may be received and processed by speech recognition engine 305. An "utterance," as used herein, refers to sound relating to user speech. Speech recognition engines are known in the art and the specific techniques used by speech recognition engine 305 in recognizing utterances will not be described in detail herein. In general, speech recognition engine 305, in addition to outputting recognition results corresponding to the input utterance may also output a confidence score that acts as a metric of how confident the speech recognition engine is in the recognition results. The confidence score may be, for example, a value between zero and one, with zero indicating the least confidence in the recognition results and one indicating the most confidence in the recognition results.

The recognition results and the confidence score generated by speech recognition engine 305 may be provided to threshold component 310. Threshold component 310 may accept a recognition result when the recognition result is greater than or equal to a predetermined threshold value and may otherwise reject the recognition result.

Threshold selection component 315 may determine which of a number of predetermined threshold values is to be used by threshold component 310. This determination may be based on a feature of the utterance, a feature of the recognition results, or a combination of the utterance and the recognition results. In some implementations, other information, such as personal information known about the user or learned about the user during an early portion of an IVR session (e.g., where a user is from), may also be used to determine which threshold to use.

The possible features that can be used by threshold selection component 315 in determining which of the number of predetermined thresholds to use are discussed in more detail below. As one example, the gender of the user may be used as a feature. A first threshold may be used for male callers and a second for female callers.

Figure 4:
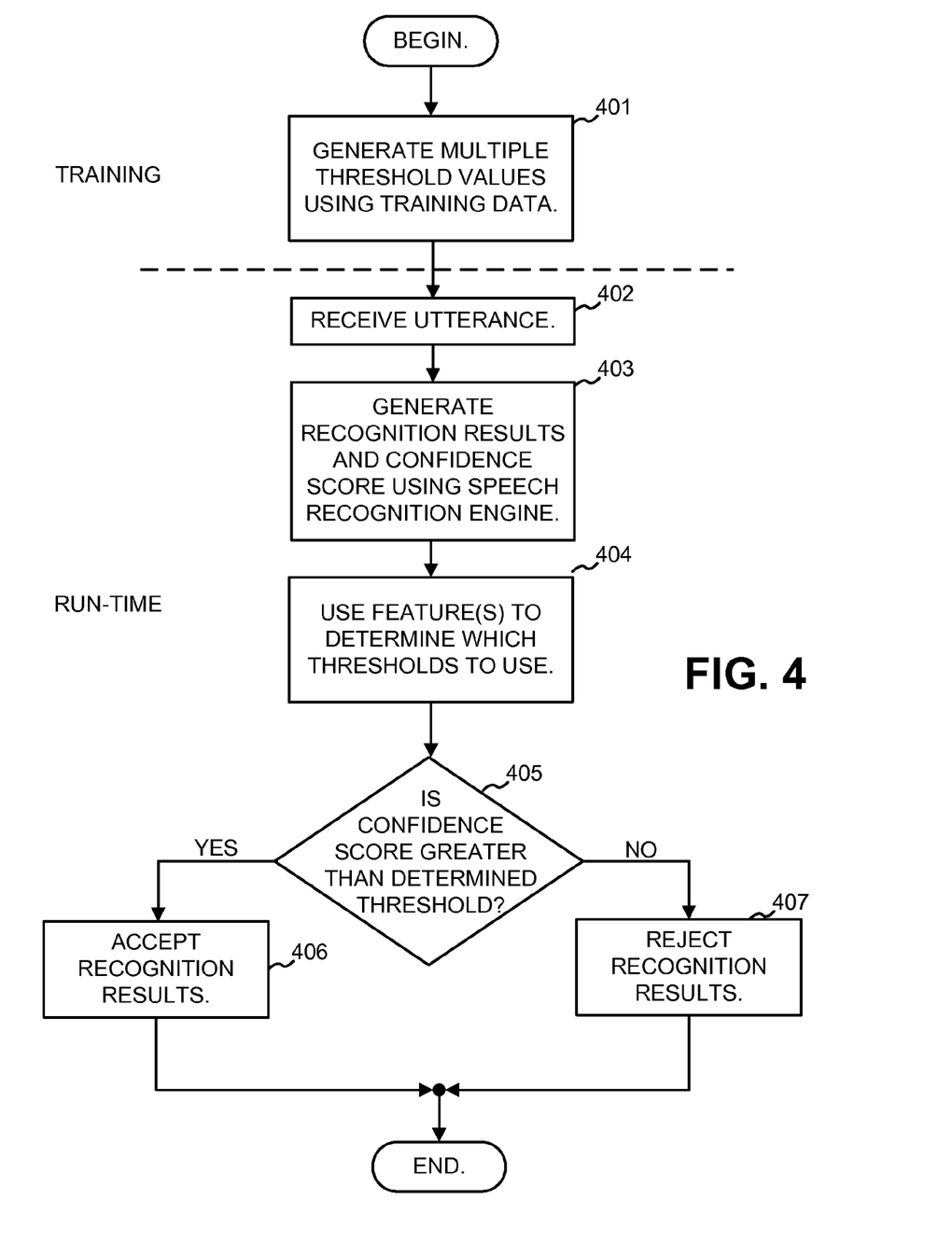
FIG. 4 is a flowchart illustrating exemplary operations of an IVR system.

FIG. 4 is a flowchart illustrating exemplary operations of IVR system 125. The operation of IVR system 125 may be separated into a training portion (act 401) and a run-time portion (acts 402-407).

Figure 5:
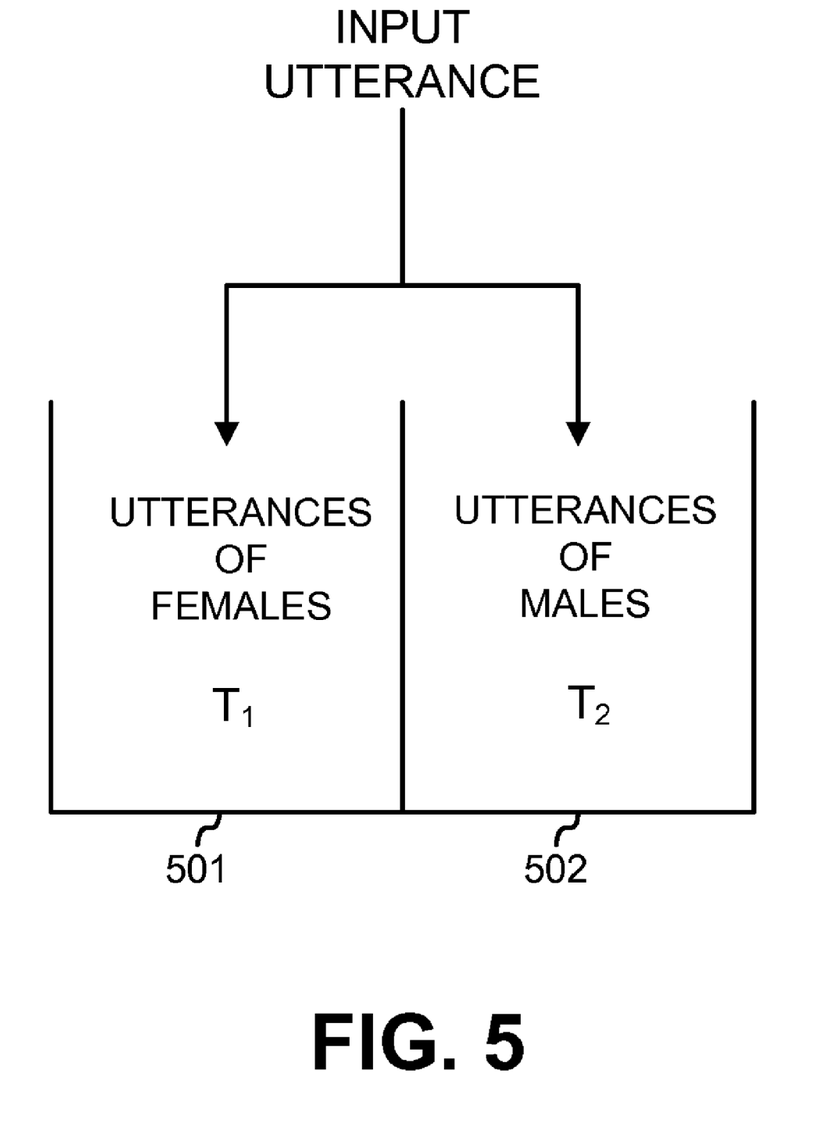
FIG. 5 is a diagram illustrating the concept of partitioning utterances based on features.

During training, an administrator may, based on one or more features and training data, generate multiple threshold values (act 401) that will be used in determining whether to accept or reject recognition results. Each of the multiple threshold values may correspond to a partition of the training data that is defined by the one or more features. FIG. 5 is a diagram illustrating the concept of partitioning utterances based on features. In the example of FIG. 5, the feature being used is gender. Gender may be determined (or at least estimated) from input utterances based on characteristics of the utterances. For example, utterances from males tend to have different spectral characteristics than utterances from females. Input utterances may be classified into a female partition 501 or a male partition 502 by threshold selection component 315. Utterances in female partition 501 may be accepted/rejected by threshold component 310 based on a comparison to threshold $T_1$ and utterances in male partition 502 may be accepted/rejected by threshold component 310 based on a comparison to threshold $T_2$.

Using multiple threshold values can lead to an improvement in the overall accuracy of IVR system 125. Training of IVR system 125 will be described in more detail below.

Once trained, IVR system 125 can be used in a run-time (i.e., real-world) operation. In the run-time operation, an utterance may be received by IVR system 125 (act 402). The utterance may be processed by speech recognition engine 305 to obtain recognition results and a confidence score (act 403). Threshold selection component 315 may determine a threshold value to use for the received utterance based on the same features used during the training of IVR system 125 (act 404). In other words, threshold selection component 315 may analyze information such as the input utterances, the recognition results, or other information to classify the input utterance into the appropriate partition defined for the feature. The threshold associated with the partition, or an indication of the threshold, may then be transmitted to threshold component 310.

If the confidence score generated by speech recognition engine 305 is greater than the threshold determined by threshold selection component 315 (act 405—YES), the recognition results may be accepted (act 406). Otherwise (act 405—NO), the recognition results may be rejected (act 407).

Training of the IVR System

Training of IVR system 125 to potentially determine multiple thresholds to use during run-time operation (FIG. 4, acts 402-407) will now be described.

When training IVR system 125, it may be desirable to optimize the overall accuracy of the system based on a particular accuracy metric. The accuracy metric used herein may be based on the correct acceptance rate over all utterances (CA/all) and the false acceptance rate over all utterances (FA/all). More specifically, IVR system 125 may be optimized based on a goal of maximizing CA/all while minimizing FA/all.

Figure 6:
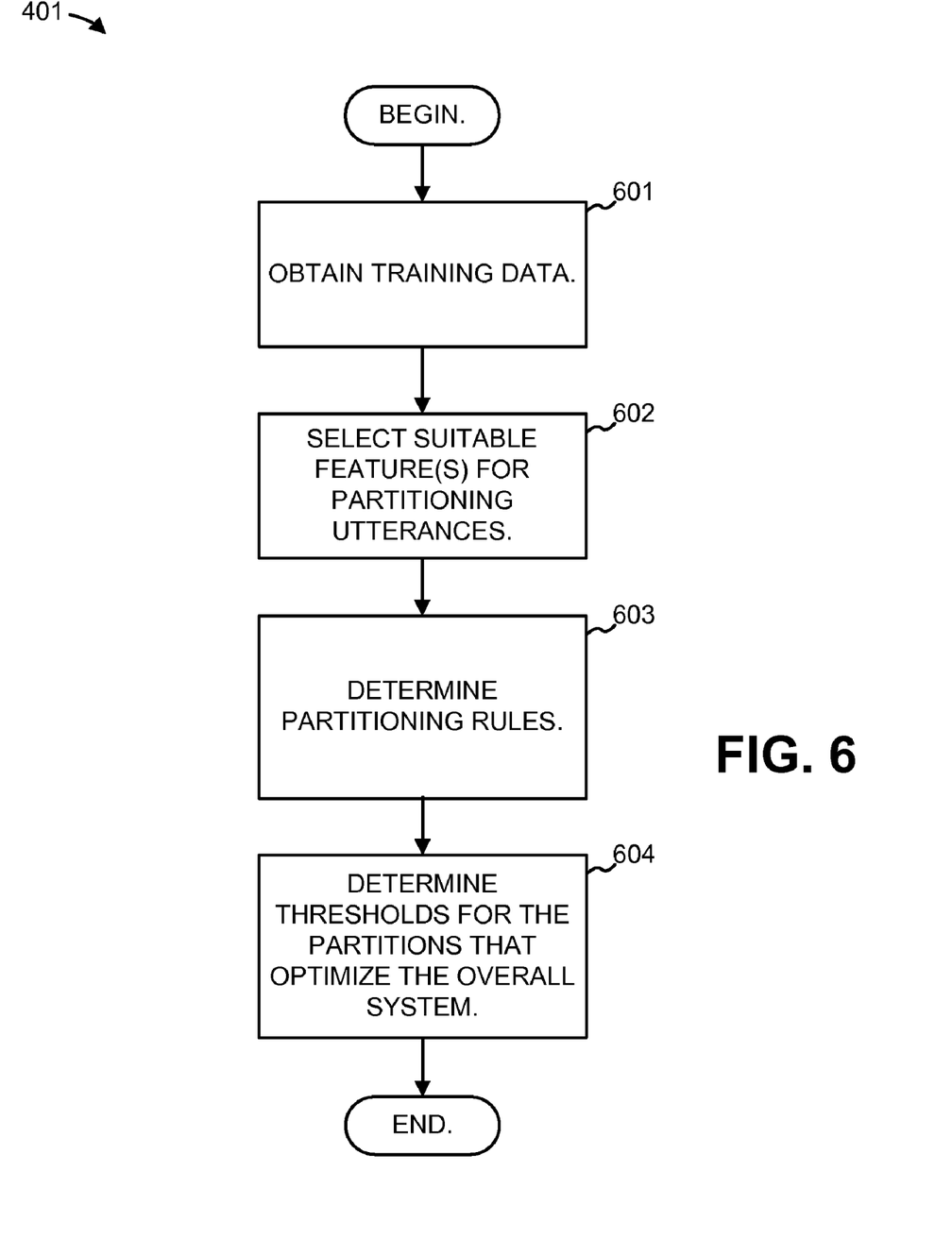
FIG. 6 is a flow chart illustrating exemplary operations for training of an IVR system.

FIG. 6 is a flow chart illustrating exemplary operations for training of IVR system 125 (act 401 in FIG. 4). To optimize IVR system 125, a training data set may be obtained corresponding to the application to which IVR system 125 is being applied (act 601). The training data set may include utterances and their corresponding recognition results, the corresponding recognition confidence scores, and an indication of whether each recognition result is correct. The indication of whether each recognition result is correct may be obtained by, for example, having a human technician listen to the utterances in the selected set of training data and indicate whether each recognition result from speech recognition engine 305 is correct.

Suitable features for partitioning the utterances may next be chosen (act 602). In choosing suitable features, it may be desirable to have utterances in each partition possess the same or similar type of confidence estimation error from speech recognition engine 305. For example, if speech recognition engine 305 systematically underestimates the confidence for shorter utterances but overestimates for longer ones, the utterance duration would be a good feature. Determining which features are suitable may be performed based on trial and error techniques using the designer's experience. The designer may, for instance, train a system using a number of different available features and then choose which of the features are suitable for run-time use based on the accuracy of the system on the training data.

Each of the suitable features can generally be either a discrete feature or a continuous feature. Discrete features may be categorical features that inherently partition the utterances when the value of the feature is known. For example, the speaker gender feature may partition each utterance into two possible categories. Examples of possible discrete features may include, but are not limited to, gender of callers, text patterns in semantic class labels output from speech recognition engine 305, caller characteristics such as geographical area, and the age group of callers. Continuous (numerical) features may not inherently partition the utterances. Instead, partitioning rules may be determined and used to partition the utterances. Examples of possible continuous features may include utterance audio duration, latency of recognition by speech recognition engine 305, the word count in the recognition output, time of day, recognition confidence in the previous recognition state of the same call session, and the same caller task success rate in a previous call session.

Partitioning rules for the selected features may be determined (act 603). As previously mentioned, for discrete features, the partitioning rules may be generally self-evident from the feature itself. Speaker gender, for instance, as illustrated in FIG. 5, may imply using two partitions. Geographical area may imply a number of partitions based on the number of possible different geographical areas being used. In some situations in which a feature may be assigned to one of a set of different categories, a catch-all partition may also be created for utterances that do not fall into any of the enumerated categories. More specifically, each training utterance may be assigned to a partition based on a feature label. Any utterances that do not match any of the defined labels may be assigned to the catch-all partition.

For continuous features, the partitioning rules may be determined by finding boundary values that define the partitions. In other words, a continuous feature may be divided into a number of possible ranges corresponding to the partitions. Locating the boundary values can be performed using a number of possible techniques, such as via an exhaustive search or another more intelligent technique. One such intelligent technique for determining partitioning rules for a continuous feature (act 603) is shown in additional detail in FIG. 7 and will now be described.

Figure 7:
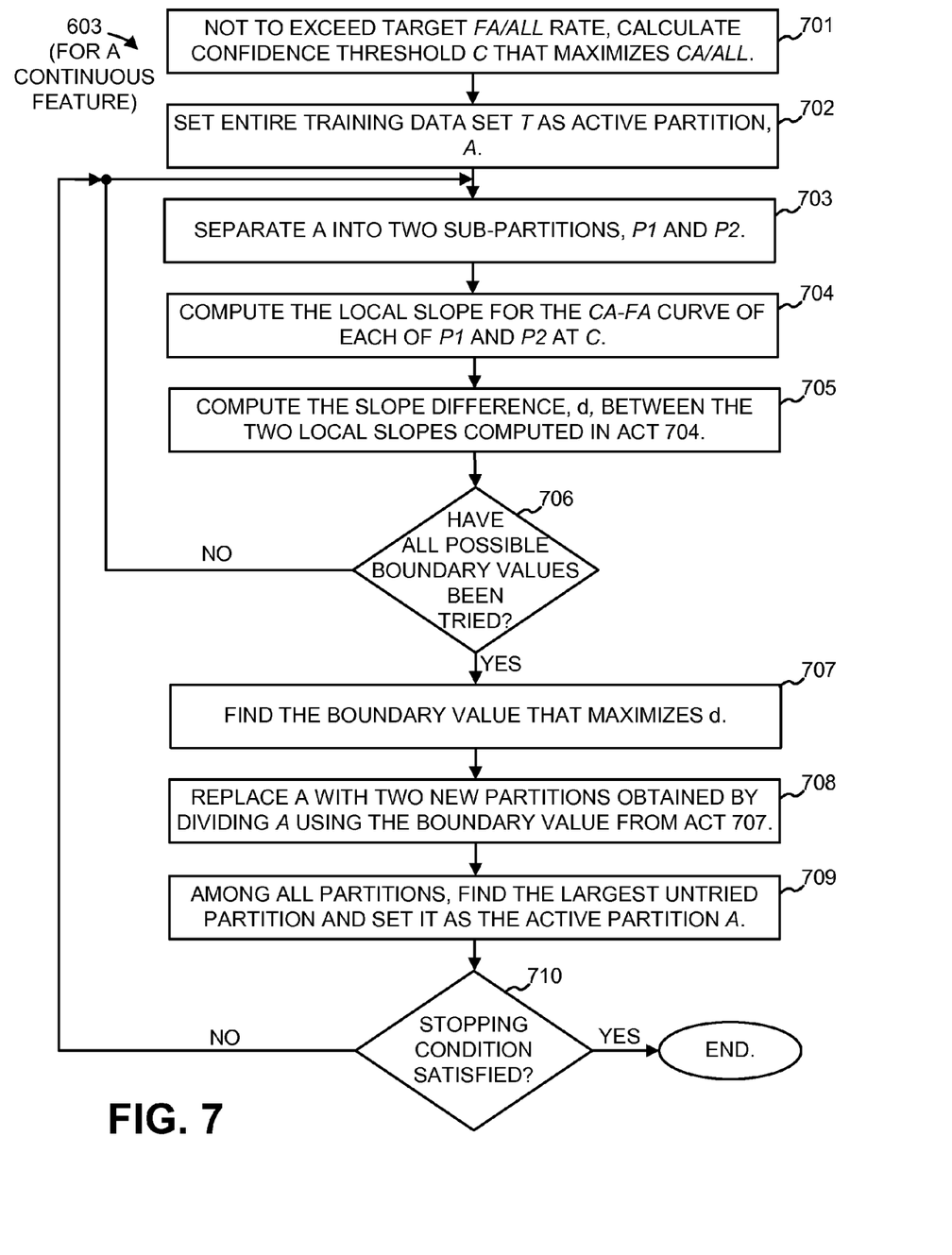
FIG. 7 is a flow chart illustrating exemplary operations for determining partitioning rules for a continuous feature.

FIG. 7 is a flow chart illustrating exemplary operations for determining partitioning rules for a continuous feature using a greedy, iterative partitioning technique. To begin, a single confidence threshold "C" may be located that maximizes CA/all on the training set while not exceeding a target FA/all rate (act 701).

As previously mentioned, CA/all and FA/all refer to the correct acceptance rate over all utterances and the false acceptance rate over all utterances, respectively. These two metrics can be calculated directly from the training data for any particular threshold value and an analysis of these two metrics may be used when picking an appropriate threshold value for a speech recognition system.

Figure 8:
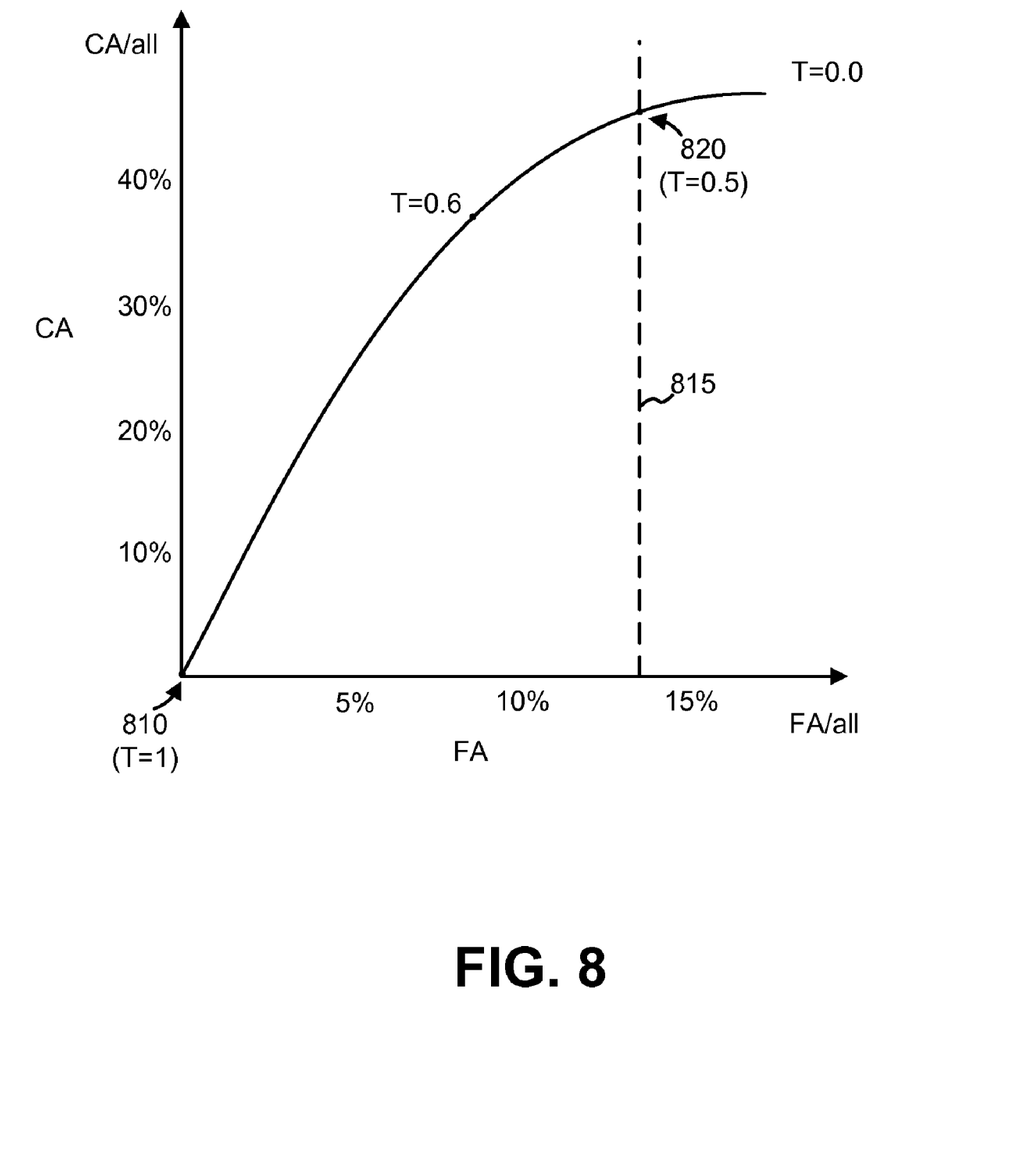
FIG. 8 is a diagram illustrating an exemplary plot of metrics used to evaluate a speech recognition system.

FIG. 8 is a diagram illustrating an exemplary plot of CA/all versus FA/all for an exemplary training data set. Different points on the plot correspond to different threshold values. As shown, when the threshold is set to one (point 810), no utterances are accepted, meaning that both CA/all and FA/all are zero. As the threshold is decreased, CA/all increases but FA/all tends to also increase. Assume in this example that the maximum acceptable FA/all (i.e., the maximum portion of false acceptances) is set at 13 percent, which is shown by dashed line 815. This corresponds to a CA/all portion of approximately 45% at point 820, which corresponds to using a threshold value of 0.5 (T=0.5) in this example.

For the example shown in FIG. 8, the single confidence threshold C that would be selected in act 701 corresponds to point 820. At this point, CA/all is maximized while not exceeding the maximum FA/all value shown by line 815. The process in FIG. 7 continues by setting the entire training data set, "T," as the active partition, "A" (act 702). Active partition A may next be separated into two sub-partitions, "P1" and "P2" (act 703). The two sub-partitions may be assigned by choosing a boundary value in the range of possible values for the continuous feature. The goal of the two sub-partitions P1 and P2 is to define the two sub partitions such that when each is assigned a different threshold, the combined CA/all is better than if a single threshold is used, along with a similar or lower combined FA/all.

Each of the sub partitions may be associated with a corresponding CA-FA curve. The local slope for the CA-FA curve may be computed for each of the two sub-partitions at C (act 704). Next, a slope difference, "d," between the two slopes (computed in act 704) may be determined (act 705). Acts 703-705 may be repeated for all possible boundary values that can be used to define the two sub-partitions P1 and P2 (act 706). "All possible boundary values," as used herein, may be obtained by analyzing the values of the continuous feature to determine the practical range of the continuous feature and incrementing from this minimum value to this maximum value of this range using a predetermined increment interval.

The slope difference (calculated in act 705) may be a useful metric of the "goodness" measure of a boundary value at the previously optimal single confidence threshold C. The rationale behind this is based on the insight that to keep the combined FA/all level in-check, the confidence thresholds should move in opposite directions along the two CA-FA curves. If the slopes are very similar, the combined CA/all and FA/all changes due to movements on the CA-FA curves (i.e., changing confidence thresholds) would roughly cancel each other out, thus providing little or no net gain in overall performance. On the other hand, if the two slopes are fairly distinct, movements along the two curves would generate a better (relative to a single threshold) combined CA/all rate for some target FA/all rate.

For the iterations of acts 703-706, the iteration may be found in which the slope difference d was maximized and all other partitioning requirements, such as a minimum size of each partition, are satisfied (act 707). The boundary value of this iteration may be used to replace active partition A with two new partitions that are divided at the boundary value (act 708). Among all of the outstanding partitions, the largest untried partition may be located in each set as the active partition A (act 709). Acts 703-709 may then be repeated until an appropriate stopping condition is satisfied (act 710). A number of different stopping criteria are possible. Possible stopping criteria can include reaching a set maximum number of partitions, reaching the minimum number of utterances remaining in each partition, or no significant slope difference achieved with new partitions. The stopping criteria may help to reduce unnecessary computational resource usage and may help to reduce the risk of overtraining.

Referring back to FIG. 6, after determining the partitions to use in act 603, thresholds may then be determined for each partition such that the overall CA/all for all the partitions rate is maximized while keeping the overall FA/all rate below the target level (act 604). In other words, a set of thresholds (one threshold for each partition) may be determined in which the overall system is optimized.

Figure 9:
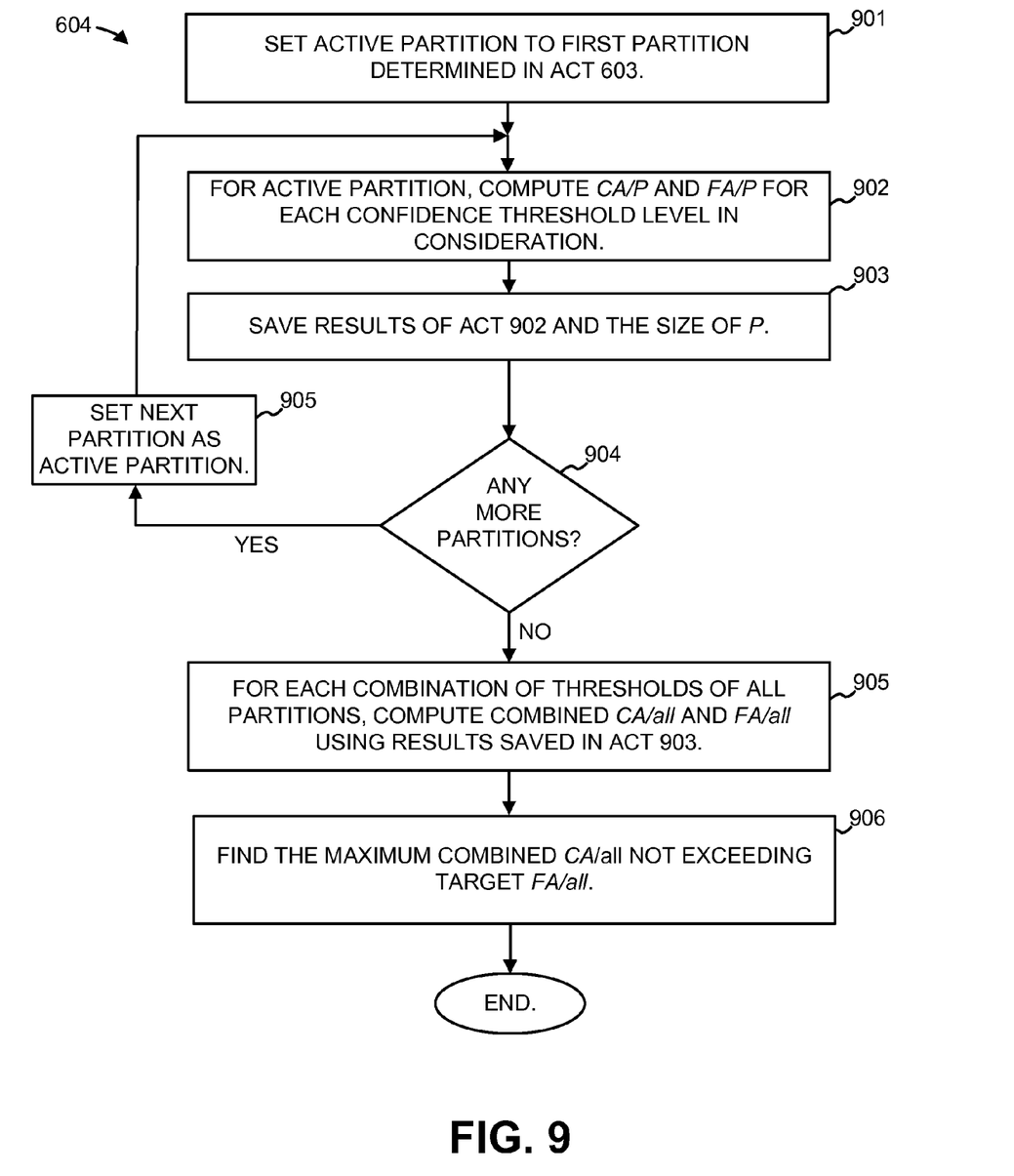
FIG. 9 is a flow chart illustrating exemplary operations for determining thresholds for partitions.

FIG. 9 is a flow chart illustrating exemplary operations for performing act 604 (FIG. 6). Each of the partitions determined in act 603 may be processed to store CA/P (i.e., the number of correct acceptances divided by the size of the partition), FA/P (i.e., the number of false acceptances divided by the size of the partition), and the size of P. More particularly, an active partition may be set as the first partition determined in act 603 (act 901). For this active partition, CA/P and FA/P may be computed for each threshold level under consideration (act 902). For example, if the range of possible threshold values is zero through one, the threshold values under consideration may be 0, 0.1, 0.2, . . . , 0.9, and 1.0. The granularity of the possible threshold values (0.1 in this example) may be varied based on the particular application. The computed CA/P and FA/P values may be saved for each threshold level, along with the size of P (act 903). Acts 902 and 903 may be repeated for each partition (acts 904 and 905).

For each combination of thresholds of all the partitions, the combined CA/all and FA/all may then be computed based on the information stored in act 903 (act 905). Of these, the maximum combined CA/all in which FA/all does not exceed the target level is determined (act 906).

It can be appreciated that acts 905 and 906 represent an exhaustive search over all combinations of threshold values. For situations in which many partitions are used or in which the granularity of the threshold increment is small, the number of possible combinations can become very large. In some situations it may therefore be desirable to use techniques such as, for example, a heuristic search or simulated annealing to speed up the calculation of acts 905 and 906.

Although FIGS. 4-9 were primarily discussed in the context of using a single feature, in some implementations, multiple features may be simultaneously used. Multiple features may be used by, for example, first applying the above-described techniques on one feature to find a set of partitions, and then using a second feature on each of the found partitions.

Further, although the above description was primarily concerned with speech recognition, concepts consistent with the invention may be more generally applied to any pattern recognition system with confidence estimation. Additionally, in some implementations, instead of dividing the training data set into different partitions and adopting a potentially different threshold for each partition, a desired threshold may be modeled with a functional form of the utterance feature, such as a regression formula.

Example Experimental Results

Examples of the use of the techniques described above will next be described. In these examples, experimental results will be presented for particular applications of multi-confidence thresholding in a speaker-independent speech recognition system implemented over a telephone.

The first example includes a listing recognition task from an automated business name search application. Callers from a particular locality are prompted to say the name of a business listing and the system attempts to recognize the caller's utterance against a grammar containing potentially hundreds of thousands of listings in the locality. The system decides whether or not to accept a recognition result based on the recognition results from speech recognition engine 305, as well as the associated confidence score. If the result is accepted, the system may play back some information related to the recognized result (e.g. phone number); otherwise, the system may play a different message and re-prompts the caller, or transfers the caller to a human operator for further assistance.

It is desirable to maximize CA/all, which correlates with the overall automation rate, while minimizing FA/all, which impacts the caller satisfaction with the service. A baseline system was defined that employs a single confidence threshold for all utterances, tuned to provide certain level of FA/all that is deemed acceptable for this task. In experiments, a multi-confidence threshold system was trained automatically using the techniques described above in which a single continuous feature (e.g., the duration of the utterance) was used to partition the training data. The training data included 6,988 listing utterances from mostly different callers in one large U.S. city. The training data was randomly divided into two equal-sized data sets and a two-fold cross validation was performed. That is, training was first performed on the first data set and tested on the second data set. Training was then performed on the second data set and tested on the first data set. For each training, the maximum number of partitions was limited to four and the minimum number of utterances in each partition was set at 500, in order to reduce the risk of overtraining. The target maximum FA/all was set at 7.7% for both the single-threshold system and the multi-threshold system.

For the multi-threshold training, the threshold boundary values and threshold values were automatically determined using the techniques described above. The results of the training are shown in Table 1, below. In Table 1, performance was averaged on the two test sets and compared to the baseline single-threshold result. Based on manual validation, almost half of the listing utterances were effectively out of grammar (i.e., unexpected response inputs such as speech from a side-conversation or non-appropriate responses to the system), meaning that the maximum theoretical value for CA/all would be approximately 50%.

As further shown in Table 1, the multi-threshold system outperformed the baseline single-threshold system by an approximately 0.7% increase in CA/all. Given the relatively low maximum theoretical value for CA/all, this increase can potentially represent a substantial performance improvement over the single-threshold baseline.

TABLE 1

|  | CA/all | FA/all |
| --- | --- | --- |
| Single Threshold | 29.0% | 7.7% |
| Multi-Threshold by Duration | 29.7% | 7.7% |

Table 2 shows the duration boundaries and optimal threshold for each of the four automatically generated partitions, based on data from one of the training sets. Note that the baseline single threshold was "56" (for this application, the speech recognition engine produced integer confidence scores between "0" and "100"). Thus, the optimal threshold of "58" for "very short" utterances was found to be higher than the baseline whereas both "short" and "medium" utterances had lower-than-baseline threshold.

TABLE 2

|  | Very Short | Short | Medium | Long |
| --- | --- | --- | --- | --- |
| Max Duration | 1.66s | 2.56s | 3.60s | +inf |
| Threshold | 58 | 54 | 52 | 56 |

A second example of the use of the techniques described above will next be described. In this example, experimental results will be presented for a multi-confidence thresholding system using a discrete feature. More specifically, this application presents a phone number confirmation task in which the system plays back to the caller a previously collected phone number and asks the caller to confirm whether or not the number is correct. The caller is supposed to answer "yes" or "no," but can also say the correct phone number directly or say "I don't know."

In the baseline system, the confidence value associated with a recognition result is compared against a single threshold to determine whether the recognition result should be accepted. The objective is again to maximize CA/all and minimize FA/all.

The data set used included 3,050 caller utterances, a little over 20% of which were manually determined to be out of grammar. Thus, CA/all cannot exceed roughly 80%. Again, the data set was randomly divided into two equal-sized data sets and a two-fold cross validation was performed.

The partition feature used in this example is a semantic interpretation class label. Each recognition result is uniquely classified as one of the following three classes: phone number string, "I don't know"-type utterance, and "yes/no"-type or other type of utterance. In this experiment, the multi-confidence threshold system was trained automatically using the techniques described above. Also, the baseline single threshold was set to "40" (in a range between "0" and "100"), which had an FA/all of 7.4%. For the multi-threshold setting, however, it was decided to target a significantly lower FA/all level of 3.0%.

Table 3 illustrates the performance comparison between the single threshold and multi-threshold systems. As can be seen from Table 3, the multi-threshold system provided a significant reduction in FA/all while maintaining a high CA/all value. The multi-threshold system, instead of using the same confidence threshold of "40", adopted a significantly higher threshold for phone number strings ("62") and "I don't know" utterances ("53"), but a significantly lower threshold for "yes/no" utterances ("21"). Intuitively this suggests that speech recognition engine 305 may have systematically overestimated confidence of phone number strings while underestimated confidence of "yes/no" output.

TABLE 3

|  | CA/all | FA/all |
|---|---|---|
| Single Threshold | 76.0% | 7.4% |
| Multi-Threshold by Semantic Class | 76.3% | 3.0% |

CONCLUSION

Multi-confidence thresholding techniques were described herein that can provide significant performance improvement in practical speech recognition applications. These techniques have several desirable characteristics. For example, they guarantee a multi-threshold setting that performs at least as well as, and potentially significantly better than, a single-threshold system on the same training data. Additionally, the techniques are generally speech recognizer independent and can be applied to any speech recognition system that provides a confidence estimate along with recognition output, without the need to access the recognition engine internals.

Moreover, while a series of acts have been described with regard to FIGS. 4, 6, 7, and 9, the order of the acts may be varied in other implementations consistent with the invention. Furthermore, non-dependent acts may be implemented in parallel or an order other than as described, as long as overall functionality consistent with the description is maintained.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system for processing an input utterance, comprising:
   a processor;
   a speech recognition engine that causes the processor to provide a recognition result corresponding to the input utterance and a confidence score corresponding to a confidence level in the recognition result;
   a threshold selection component that selects, based on the input utterance, a threshold value corresponding to the input utterance;
   wherein, the selected threshold value is determined based on classification of the input utterance into a partition of multiple partitions in a set of training data;
   wherein, each of the multiple partitions is associated with a threshold value;
   wherein, the selected threshold value corresponding to the input utterance is the threshold value associated with the partition into which the input utterance is classified.

2. The system of claim 1,
   further comprising, a threshold component configured to accept the recognition result based on a comparison of the confidence score to the selected threshold value;
   wherein the threshold component accepts the recognition result when the confidence score is above the selected threshold value and rejects the recognition result when the confidence score is below the selected threshold value.

3. The system of claim 1, wherein the feature is a continuous feature.

4. The system of claim 3, wherein the continuous feature includes, one or more of, an utterance audio duration, a latency of recognition by the speech recognition engine, a word count in the recognition results, or a time of day.

5. The system of claim 3, wherein the set of partitions for the continuous feature is defined by boundary values automatically determined during training of the speech recognition system using the training data.

6. The system of claim 1, wherein the feature is a discrete feature.

7. The system of claim 6, wherein the discrete feature includes, one or more of, gender, geographical area, or age group of callers.

8. The system of claim 1, wherein the threshold selection component determines the threshold value from a plurality of predetermined possible threshold values.

9. The system of claim 1, wherein the speech recognition system is an interactive voice response system.

10. A computer-readable medium having stored thereon a set of instructions which when executed causes a processor to perform a method of processing input information, the method, comprising:
    generating a recognition result corresponding to the input information;
    determining a confidence score corresponding to a confidence level in the accuracy of the speech recognition result;
    classifying the input information into one of a plurality of partitions defined from training data based on a feature relating to the input information or to the user;
    wherein, each of the multiple partitions is associated with each of a plurality of threshold values;
    determining a threshold value from the plurality of threshold values;
    wherein, the determined threshold value is one of the plurality of threshold values that is associated with the partition into which the input utterance is classified;

determining whether to accept or reject the recognition result based on the determined threshold value and the confidence score.

11. The method of claim 10, wherein determining whether to accept or reject the recognition result includes:
accepting the recognition result when the confidence score is above the determined threshold value and rejecting the recognition result when the confidence score is below the determined threshold value.

12. The method of claim 10, wherein boundary values that define the plurality of partitions are automatically determined based on the training data.

13. The method of claim 10, wherein the plurality of threshold values are automatically determined based on the training data.

14. The method of claim 10, wherein the feature is a continuous feature.

15. The method of claim 14, wherein the continuous feature is one or more of an utterance audio duration, a latency of producing speech recognition results, or a time of day.

16. The method of claim 10, wherein the feature is a discrete feature.

17. The method of claim 16, wherein the discrete feature is one or more of gender, geographical area, or age group of users.

18. The device of claim 10, wherein the input information includes an audible utterance from the user and the recognition result includes a speech recognition result of the utterance.

19. A computer-readable medium having stored thereon a set of instructions which when executed causes a processor to perform a method comprising:
obtaining training data;
defining partitions for the training data based on a feature associated with the training data; and
determining a confidence threshold for each partition based on the feature,
wherein, in run-time operation, input information is converted into recognition results and the input information detected as having the feature is classified into one of the partitions of the training data defined using the feature and accepted or rejected as valid recognition results based on a comparison of the confidence threshold corresponding to the one of the partitions defined using the feature.

20. The method of claim 19, wherein automatically determining the confidence threshold for each partition is based on a determination of confidence threshold values that maximize, for the training data, a correct acceptance rate of the pattern recognition system while maintaining a false acceptance rate below a preset rate.

21. The method of claim 19, wherein the feature is defined over a continuous range and the partitions are defined automatically as ranges within the continuous range.

22. The method of claim 21, wherein the automatically defined ranges within the continuous range are based on a greedy iterative partitioning technique.

23. The method of claim 19, wherein the training data includes speech utterances, speech recognition results, and a confidence score for each of the speech recognition results.

24. A computer-readable medium having stored thereon a set of instructions which when executed causes a processor to perform a method of generating a recognition result from input information, the method, comprising:
defining multiple partitions for training data based on features associated with the training data;
generating multiple threshold values each corresponding to each of the multiple partitions of the training data;
wherein, the input information having a particular feature is classified into a partition of the multiple partitions that is defined using the particular feature;
wherein, the recognition result is accepted or rejected based on comparison of the confidence threshold generated for the partition.

25. A system, comprising:
means for, defining multiple partitions for training data based on features associated with the training data;
means for, generating multiple threshold values each corresponding to each of the multiple partitions of the training data;
means for, generating a recognition result from input information;
means for, classifying the input information having a particular feature into a partition of the multiple partitions that is defined using the particular feature;
wherein, the recognition result is accepted or rejected based on comparison of the confidence threshold generated for the partition of the multiple partitions.

26. A system, comprising:
means for, receiving an input utterance, to provide recognition results corresponding to the input utterance, and to provide a confidence score corresponding to a confidence level in the recognition results;
means for, determining, based on the input utterance, a threshold value corresponding to the input utterance;
wherein, the threshold value is determined by classification of the input utterance into one of a set of partitions defined from training data;
wherein, the classification of the received input utterance is performed based on a feature associated with the input utterance;
means for, accepting the recognition result based on a comparison of the confidence score to the threshold value;
wherein the threshold component accepts the recognition result when the confidence score is above the threshold value and rejects the recognition result when the confidence score is below the threshold value.

* * * * *

UNITED STATES PATENT AND TRADEMARK OFFICE
CERTIFICATE OF CORRECTION

PATENT NO.      : 7,657,433 B1                                      Page 1 of 1
APPLICATION NO. : 11/530212
DATED           : February 2, 2010
INVENTOR(S)     : Shuangyu Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Thirtieth Day of November, 2010

David J. Kappos
*Director of the United States Patent and Trademark Office*